(12) United States Patent
McClendon et al.

(10) Patent No.: US 10,324,538 B2
(45) Date of Patent: Jun. 18, 2019

(54) DYNAMIC WATCH USER INTERFACE

(71) Applicant: Garmin Switzerland GmbH, Schaffhausen (CH)

(72) Inventors: Philip S. McClendon, Overland Park, KS (US); Austen D. Harbour, Olathe, KS (US); Jill M. Kaiser, Overland Park, KS (US)

(73) Assignee: Garmin Switzerland GmbH (CH)

( * ) Notice: Subject to any disclaimer, the term of this patent is extended or adjusted under 35 U.S.C. 154(b) by 66 days.

(21) Appl. No.: 15/251,752

(22) Filed: Aug. 30, 2016

(65) Prior Publication Data
US 2018/0059809 A1    Mar. 1, 2018

(51) Int. Cl.
| | |
|---|---|
| *G06F 3/0346* | (2013.01) |
| *G06F 3/041* | (2006.01) |
| *G06F 3/044* | (2006.01) |
| *G06F 3/0485* | (2013.01) |
| *G06F 3/0482* | (2013.01) |
| *G06F 3/0484* | (2013.01) |
| *G06F 3/0481* | (2013.01) |

(52) U.S. Cl.
CPC ............ *G06F 3/0346* (2013.01); *G06F 3/044* (2013.01); *G06F 3/0412* (2013.01); *G06F 3/0416* (2013.01); *G06F 3/0482* (2013.01); *G06F 3/0485* (2013.01); *G06F 3/04817* (2013.01); *G06F 3/04845* (2013.01)

(58) Field of Classification Search
CPC .............................. G06F 3/0346; G06F 3/0482
See application file for complete search history.

(56) References Cited

U.S. PATENT DOCUMENTS

| | | | |
|---|---|---|---|
| 6,891,778 B1 * | 5/2005 | Hohenstein | G04B 19/04 368/223 |
| 7,134,784 B1 * | 11/2006 | Marin | G04B 19/283 368/295 |
| 8,514,170 B2 | 8/2013 | Brewer et al. | 345/111 |
| 8,740,451 B2 | 6/2014 | Gourdin | 368/308 |
| 9,239,648 B2 | 1/2016 | Smus | 345/173 |
| 9,367,086 B2 | 6/2016 | Yilmaz | 345/173 |
| 2014/0062860 A1 | 3/2014 | Lee et al. | 345/156 |
| 2014/0180595 A1 * | 6/2014 | Brumback | A61B 5/0015 702/19 |
| 2015/0022438 A1 * | 1/2015 | Hong | H04M 1/7253 345/156 |
| 2015/0026647 A1 * | 1/2015 | Park | G06F 3/0488 715/863 |

(Continued)

*Primary Examiner* — Nitin Patel
*Assistant Examiner* — Robert M Stone
(74) *Attorney, Agent, or Firm* — Samuel M. Korte; Max M. Ali

(57) ABSTRACT

Techniques are disclosed to facilitate a watch user interface (UI) that adjusts based upon watch orientation. The watch may include user input devices that allow a user to interact with the watch via the UI. The user input devices may be coupled to the watch at various locations, and the UI may rotate and/or otherwise compensate for changes determined in the watch orientation. As the watch is reoriented (e.g., rotated by 180 degrees), the user input devices are moved to new positions with respect to the user interface. The techniques described herein adjust the functionality provided by the user input devices to provide a consistent UI experience regardless of the watch orientation.

14 Claims, 4 Drawing Sheets

(56) References Cited

U.S. PATENT DOCUMENTS

| | | | |
|---|---|---|---|
| 2015/0213580 A1* | 7/2015 | Yamano | G09G 3/20 |
| | | | 345/649 |
| 2015/0301608 A1* | 10/2015 | Nagaraju | G06F 3/0488 |
| | | | 345/156 |
| 2016/0077592 A1* | 3/2016 | Bhesania | G06F 3/011 |
| | | | 345/650 |
| 2016/0170598 A1* | 6/2016 | Zambetti | G06F 3/0485 |
| | | | 715/784 |
| 2016/0170608 A1* | 6/2016 | Zambetti | G06F 1/163 |
| | | | 715/810 |
| 2016/0187920 A1* | 6/2016 | Wei | G06F 1/163 |
| | | | 700/40 |
| 2016/0349845 A1* | 12/2016 | Poupyrev | G06F 3/016 |
| 2017/0185258 A1* | 6/2017 | Fu | G06F 3/0488 |
| 2018/0059903 A1* | 3/2018 | Lim | G06F 3/02 |

* cited by examiner

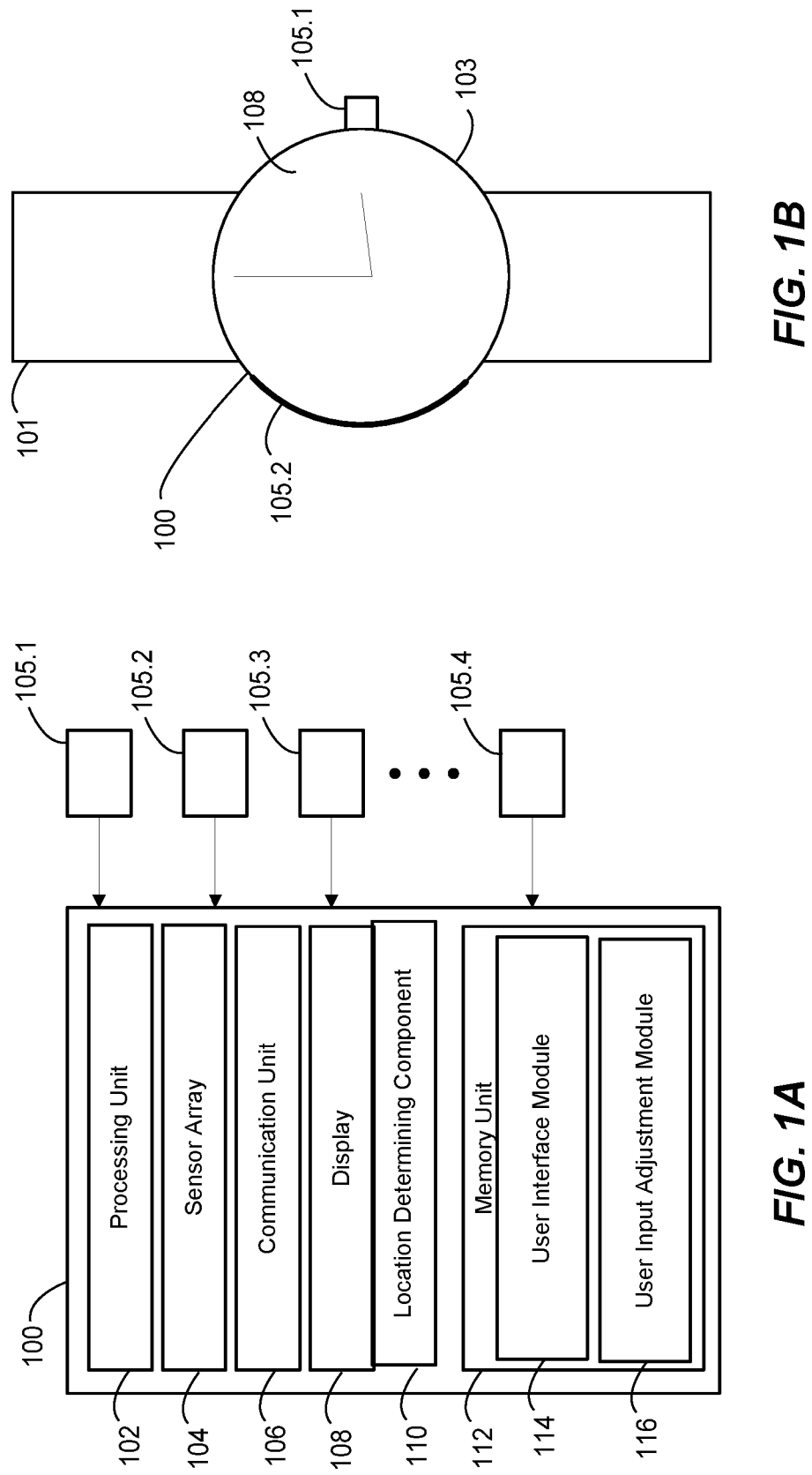

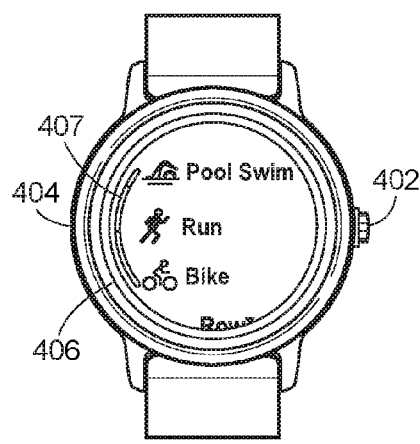
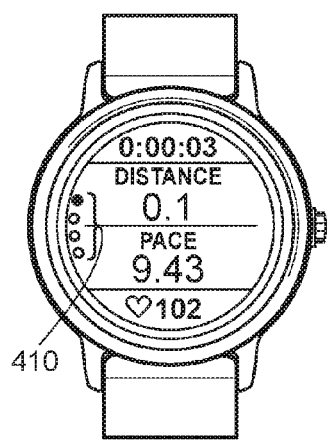
FIG. 4A  FIG. 4B  FIG. 4C
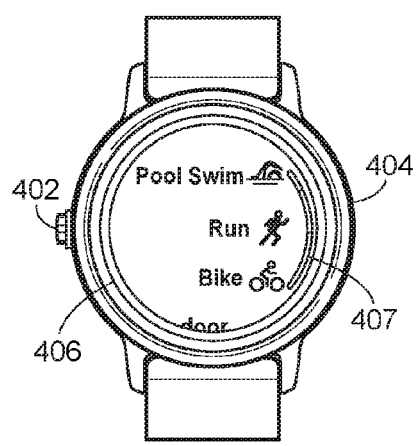
FIG. 4D  FIG. 4E  FIG. 4F

DYNAMIC WATCH USER INTERFACE

BACKGROUND

Watches have evolved beyond their initial use to strictly tell time. Modern-day watches may include various "smart" features, such as fitness monitoring and navigation, and may work in conjunction with smart phones. These so-called "smartwatches" may include a user interface (UI), which allows a user to interact with the watch to view information and/or change watch settings. If a touch-screen display is utilized, interaction with the UI is typically accomplished via the touch-screen display, although smartwatches may include other user input devices such as crowns and buttons that may be depressed or rotated.

It is preferable to provide additional options to interchange how a watch (e.g., smartwatch) is worn on a user's wrist. For example, right-handed users may prefer to wear the smartwatch on their left hand, and vice-versa. Similarly, right-handed users may prefer to wear the watch on their left and rotate the orientation of the watch (180 degrees), while continuing to wear the watch on their left hand. This rotation results in user input devices (e.g., button(s), touch strip(s), etc.) that were originally pointing in the direction of the user's finger tips to now point in the direction of the user's elbow. The user may also changeover (switch) the watch bands so that a buckle, latch or other mechanism used to fasten the watch to the user's wrist may be in a familiar orientation and location. Changing the orientation of the watch in this manner, however, impacts the position of user input devices as well as the presentation of the UI on the watch display. To remedy the presentation of the UI, typical smartwatches may provide an option for users to specify the watch orientation. However, because the functionality provided by user-input devices does not change with changes in watch orientation, using the user input devices, as the user wishes to use them, becomes cumbersome and confusing even when the UI is adjusted to account for changes in watch orientation.

SUMMARY

Techniques are disclosed to facilitate a dynamic watch user interface (UI). The watch may include one or more user input devices such as buttons, crowns, capacitive touch strips, etc., as well as a display to present the UI, which may be a touch-screen display. Users may interact with the UI via the user input devices as well as the touch-screen display. The user input devices may be coupled to the watch at various fixed locations, and the UI may rotate and/or otherwise compensate as the watch orientation is changed. This may include rotating the UI to avoid presenting information upside-down or otherwise compensating for information displayed to present information in a manner that is more aesthetic or more easily interpreted.

In addition to compensation of the UI to account for changes in watch orientation, the user input devices may be re-positioned or reconfigured to provide functionality associated with the current orientation. For example, a button located at "4:30" (in terms of the watch face) when the watch is worn in an upright orientation may be relocated to "10:30" when the watch is rotated 180 degrees to be worn in an upside-down orientation on the same hand or moved to a different hand.

In an embodiment, the functionalities provided by one or more user input devices may be adjusted based upon the orientation of the watch such that, regardless of the physical position of the user input device, the same UI functionality is maintained by the watch for a current orientation. Using the example above, the functionalities associated with two buttons, one in the 4:30 position and another in the 10:30 position, may be switched (swapped) when the watch orientation is rotated by 180 degrees. As a result, even though a different button is located at the 10:30 position upon the watch being flipped (the button formerly at 4:30), user inputs from each button are adjusted such that a consistent UI functionality is maintained regardless of the orientation of the watch.

To provide another example, user inputs may include one or more capacitive touch strips. A user may utilize a capacitive touch strip located on a left side wall of the watch to perform upward (i.e., slide a finger in the clockwise direction) and downward (i.e., slide a finger in the counterclockwise direction) gestures along the touch strip to provide user interface functionalities such as upward and downward scrolling, for example. Embodiments include the watch interpreting a downward gesture in a first orientation as an upward gesture in a second orientation, and vice-versa. Therefore, embodiments include the watch interpreting user inputs received via user gestures in a dynamic manner that is dependent upon watch orientation. In this way, the user interface and functionality of each user input device relative to the watch orientation is maintained.

As previously described, in some embodiments, the orientation of the watch may be determined (e.g., detected using a sensor), and the functionalities associated with the user interface and the user input devices may be automatically changed to account for the current watch orientation. In other embodiments, the orientation of the watch may be manually selected by the user via interaction with the UI, or other conditions may be specified that affect the adjustment of received user inputs. In still other embodiments, a user may specify any combination of user input devices to change functionality based upon watch orientation. For example, a user may select specific user input devices that change user interface functionality with watch orientation, while other user input devices do not change.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

FIGS. 1A and 1B correspond to a block diagram of an example watch 100 and an illustration of an example watch 100, respectively, in accordance with various embodiments of the present disclosure;

FIGS. 4A-4F are illustrations of various watch displays showing the compensation of the user interface due to the watch orientation, in accordance with an embodiment of the present disclosure.

DETAILED DESCRIPTION

Figure 2A:
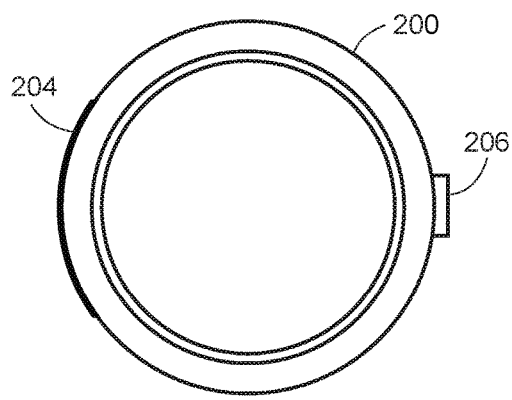
FIGS. 2A-2D are illustrations of various watches having different combinations of user-input devices, in accordance with various embodiments of the present disclosure.

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

FIGS. 1A and 1B correspond to a block diagram of an example watch 100 and an illustration of an example watch 100, respectively, in accordance with various embodiments of the present disclosure. Watch 100, as shown in FIG. 1B, is an example embodiment of a watch, which includes a band 101, a housing 103, a display 108, and user input devices 105.1 and 105.2. However, watch 100 may have various implementations that deviate from the design shown in FIG. 1B. For example, watch 100 may have a rectangular or square display 108 as opposed to the round display 108 shown in FIG. 1B. Furthermore, watch 100 may include different types of user input devices, a different number of user input devices, and/or user input devices positioned at other locations of watch 100, some examples of which being further discussed below with respect to FIGS. 2A-D.

In an embodiment, watch 100 may include a processing unit 102, a sensor array 104, a communication unit 106, a display 108, a location determining component 110, and a memory unit 112. One of more of processing unit 102, sensor array 104, communication unit 106, display 108, location determining component 110, and/or memory unit 112 may be coupled to one another (e.g., via data buses or other suitable interconnections) and/or otherwise configured to communicate with one another in any suitable manner. Watch 100 may also include any suitable number N of user input devices 105.1-105.N. Watch 100 may include additional or fewer elements than those illustrated in FIG. 1A. For example, a power source, ports, interconnects, etc., are not shown in FIG. 1A or further described herein for purposes of brevity. Furthermore, although illustrated as separate elements, any suitable combination of elements shown in FIG. 1A may be integrated as part of a single component.

Processing unit 102 may be configured to communicate and/or operate in conjunction with one or more of sensor array 104, communication unit 106, display 108, location determining component 110, and/or memory unit 112 to facilitate one or more functions of the embodiments as described herein. Processing unit 102 may be implemented as any suitable type and/or number of processors, such as a host processor of watch 100, for example. To provide additional examples, processing unit 102 may be implemented as an application specific integrated circuit (ASIC), an embedded processor, a central processing unit (CPU) associated with watch 100, etc.

Processing unit 102 may be configured to execute instructions stored in memory unit 112, to store data to memory unit 112, and/or to retrieve data from memory unit 112. In accordance with various embodiments, memory unit 112 may be a computer-readable non-transitory storage device that may include any suitable combination of volatile (e.g., a random access memory (RAM), or non-volatile memory (e.g., battery-backed RAM, FLASH, etc.). The execution of instructions stored in the various modules of memory unit 112 via processing unit 102 to facilitate various functions of watch 100 are further discussed below. Processing unit 102 may also store other types of data to memory unit 112, such as data collected via one or more sensors implemented via sensor array 104, map data, etc.

Sensor array 104 may be implemented as any suitable number and/or type of sensors configured to measure, detect, monitor, and/or quantify one or more physical characteristics and/or to generate sensor data based upon one or more physical characteristics. Sensor array 104 may be advantageously mounted or otherwise positioned within watch 100 to facilitate these functions. Sensor array 104 may be configured to sample and/or generate sensor data continuously, or in accordance with any suitable sampling rate, such as once per second, once per every 5 seconds, once per every 10 seconds, once per every 30 seconds, etc.

Examples of suitable sensor types implemented by sensor array 104 may include one or more accelerometers, gyroscopes, perspiration detectors, compasses, speedometers, magnetometers, barometers, barometric altimeters, thermometers, proximity sensors, light sensors, Hall Effect sensors, electromagnetic radiation sensors (e.g., infrared and/or ultraviolet radiation sensors), humistors, hygrometers, altimeters, biometrics sensors (e.g., heart rate monitors, blood pressure monitors, skin temperature monitors, galvanic skin response monitors), microphones, etc.

In an embodiment, one or more sensors implemented as part of sensor array 104 may determine a current orientation of watch 100, and provide data indicative of the current watch orientation. Additionally or alternatively, processing unit 102 may analyze sensor data generated by one or more sensors implemented via sensor array 104 to determine a current orientation of watch 100. For example, sensor array 104 may include an accelerometer and/or gyroscope that provides sensor data indicative of changes in the orientation of watch 100. In any event, embodiments include processing unit 100 and/or sensor array 104 determining the present orientation of watch 100 as well as detecting changes in the orientation of watch 100 from the present orientation. For example, sensor array 104 may provide sensor data that is interpreted by processing unit 102 to detect when watch 100 is rotated 180 degrees, which may be the case, for example, when watch 100 is switched from one wrist to another.

Communication unit 106 may be configured to support any suitable number and/or type of communication protocols to facilitate communications between watch 100 and one or more external computing devices, which are not shown in FIG. 1A for purposes of brevity. Communication unit 106 may be configured to facilitate communications with different devices using different types of communication protocols or the same type of communication protocol. Communication unit 106 may be implemented with any suitable combination of hardware and software, and/or may work in conjunction with processing unit 102, to facilitate such functionality. For example, communication unit 106 may be implemented with any number of wired and/or wireless transceivers, ports, connectors, etc.

For example, communication unit 106 may facilitate wireless communications between watch 100 and a mobile computing device via a BLUETOOTH communication protocol, ANT/ANT+ communication protocol, or a Wi-Fi communication protocol. To provide another example, communication unit 106 may facilitate communications between watch 100 and a desktop computer via a wired universal serial bus (USB) protocol. To provide yet another example, communication unit 106 may facilitate communications between watch 100 and one or more external computing devices, such as backend computing devices via a wireless cellular communication protocol, Wi-Fi or other communication protocol.

Display 108 may be implemented as any suitable type of display, and may be configured to provide feedback to a user and facilitate user interaction with watch 100 via a user interface. For example, display 108 may be implemented as a capacitive touch screen display, a resistive touch screen display, etc. In various aspects, display 108 may be configured to work in conjunction with one or more user input devices 105.1-105.N, user interface module 114, and/or processing unit 102 to detect user inputs received via user input devices 105.1-105.N and to provide feedback to a user. In various embodiments, display 108 may have any suitable size and/or shape to accommodate the particular watch design, which may be chosen for aesthetic, design, and/or functional purposes.

Location determining component 110 may be implemented as a satellite navigation receiver that works with a global navigation satellite system (GNSS) such as the global positioning system (GPS), the GLONASS system primarily used in the Soviet Union, the BeiDou system primarily used in China, or the Galileo system primarily used in Europe. The GNSS includes a plurality of satellites in orbit about the Earth. The orbit of each satellite is not necessarily synchronous with the orbits of other satellites and, in fact, is likely asynchronous. A GNSS equipped device such as watch 100 may receive spread spectrum satellite signals from these various satellites. The spread spectrum signals continuously transmitted from each satellite use a highly accurate frequency standard accomplished with an extremely accurate atomic clock. Each satellite, as part of its data signal transmission, transmits a data stream indicative of that particular satellite. Watch 100 should acquire spread spectrum satellite signals from at least three satellites for the receiver device to calculate its two-dimensional position by triangulation. Acquisition of an additional signal, resulting in signals from a total of four satellites, permits watch 100 to calculate its three-dimensional position.

Location determining component 110 and processing unit 102 may be configured to receive navigational signals from such satellites and to calculate a current position of watch 100 as a function of the received signals. Location determining component 110 and processing unit 102 may also determine and store in memory unit 112 track logs or any other series of geographic coordinates corresponding to points along a route or other path traveled by a user of watch 100. Location determining component 110 and/or processing unit 110 may also be configured to calculate routes to desired locations, provide instructions to navigate to the desired locations, display maps and other information on the display screen, and to execute other functions described herein.

Location determining component 110 may include one or more processors, controllers, or other computing devices and memory to calculate location and other geographic information without processing unit 102, or it may utilize the components of the processing unit 102. Further, location determining component 110 may be integral with processing unit 102 such that location determining component 110 may be configured to specifically perform the various functions described herein. Thus, processing unit 102 and location determining component 110 may be combined or be separate or otherwise discrete elements.

Location determining component 110 may include an antenna to assist in receiving the satellite signals, which is not shown in FIG. 1A for purposes of brevity. The antenna may be a patch antenna, a linear antenna, or any other suitable type of antenna that may be used with navigation devices. The antenna may be mounted directly on or in a housing of watch 100, or may be mounted external to such a housing.

Although embodiments of watch 100 may include a satellite navigation receiver, it will be appreciated that other location-determining technology may be used. For example, communication unit 106 may be used to determine the location of watch 100 by receiving data from at least three transmitting locations and then performing basic triangulation calculations to determine the relative position of watch 100 with respect to the transmitting locations. For example, cellular towers or any customized transmitting radio frequency towers may be used instead of satellites. With such a configuration, any standard geometric triangulation algorithm may be used to determine the location of watch 100.

In other embodiments, location determining component 110 need not directly determine the current geographic location of watch 100. For instance, location determining component 110 may determine the current geographic location through a communications network, such as by using Assisted Global Positioning System (A-GPS) by receiving communications from a combination of base stations and/or satellites, or from another electronic device. Location determining component 110 may even receive location data directly from a user. For example, a user may obtain location data for a navigated route before and after it has been completed from another satellite navigation receiver or from another source and then manually input the data into watch 100.

User input devices 105.1-105.N may include any suitable number and/or type of devices configured to receive user input. For example, user input device 105.1 may correspond to a depressible button, as shown in FIG. 1B and discussed further herein. To provide another example, user input device 105.2 may correspond to a capacitive touch strip, as shown in FIG. 1B, which is also further discussed herein. To provide additional examples, one or more of user input devices 105.1-105.N may be implemented as knobs, switches, crowns, etc., which may be coupled to watch 100 at various locations. To provide more examples, one or more of user input devices 105.1-105.N may be associated with interactive portions of display 108. That is, in embodiments in which display 108 is implemented as a touch-screen display, one or more of user input devices 105.1-105.N may correspond to a user touching display 108 to provide various types of user input. To provide yet another example, one or more of user input devices 105.1-105.N may be implemented as other mechanical or electro-mechanical components of watch 100, such as a rotatable bezel, for example, which may be rotated clockwise or counter-clockwise to provide user input.

In embodiments in which one or more of user input devices 105.1-105.N is implemented as a capacitive touch strip, such touch strips may be coupled to the housing of watch 100 and formed in any suitable size or shape. Furthermore, capacitive touch strips may be implemented with any suitable number of individual capacitive segments or portions (e.g., 4 individual segments, 10 individual segments, etc.). As a user interacts with one or more of user input devices 105.1-105.N, processing unit 102 may receive the user input, and process the user input to provide a particular user interface function. To do so, processing unit 102 may execute instructions stored in each of user interface module 114 and/or user input adjustment module 116, the details of which are further discussed below.

User interface module 114 is a portion of memory unit 112 configured to store instructions, that when executed by processing unit 102, cause processing unit 102 to perform various acts in accordance with applicable embodiments as described herein. In an embodiment, user interface module 114 includes instructions, that when executed by processing unit 102, causes processing unit 102 to work in conjunction with one or more user input devices 105.1-105.N, sensor array 104, and/or display 108, to detect user inputs received via user input devices 105.1-105.N, and to provide feedback to a user via display 108 in accordance with the interpreted user interface function associated with the detected user input.

In an embodiment, user interface module 114 may facilitate processing unit 102 causing changes in display 108 based upon interpreted user inputs received via one or more of user input devices 105.1-105.N. The interpretation of user input is based upon the receipt of user input and the adjustment of that user input based upon various conditions, such as the watch orientation, for example. Therefore, embodiments include processing unit 102 executing instructions stored in user interface module 114 to initially interpret user input via one or more user-input devices 105.1-105.N. This may include, for example, determining the current state of the user interface (e.g., which menu options are displayed), whether a button was depressed, the direction in which a gesture was performed, etc. Once the user input is initially interpreted, the corresponding user interface functionality provided in response to the received user input (e.g., scrolling in a certain direction) is then interpreted in accordance with execution of instructions stored in user input adjustment module 116.

For example, display 108 may present a user interface that includes various menu options, and instructions stored in user interface module 114 may enable processing unit 102 to process user inputs to allow a user to navigate through these menu options to adjust settings, select or change certain options, etc. To provide another example, the user interface displayed via display 108 may allow a user to change watch functions, view data stored on watch 100, or to otherwise interact with watch 100.

Of course, a corresponding user interface function for a particular user input may be based upon the type of user input device and how a user interacts with that particular user input device. For example, if user input device 105.1 is implemented as a button, then the user input associated with user input device 105.1 may be representative of a user pressing this button, and the corresponding user interface function may be one relevant to this type of user input. To provide another example, if user input device 105.2 is implemented as a capacitive touch strip, then the user input associated with user input device 105.2 may be representative of user inputs associated with a user touching this capacitive touch strip, with the corresponding user interface function being relevant to this type of user input.

For example, display 108 may present a user interface with several menu options, allowing a user to scroll through and select particular options. Continuing this example, a user may select an option by pressing user input device 105.1, and scroll through the menu options while interacting with user input device 105.2. The details of such an interaction are further discussed below with reference to FIG. 3.

Again, capacitive touch strip 105.2 may be implemented with several capacitive touch segments, as discussed above. A user may interact with a capacitive touch strip in various ways depending on the particular user interface function that is desired. For example, a user may perform a gesture with his finger by moving his finger along the capacitive touch strip in a particular direction with respect to the capacitive touch strip, such as in a counter-clockwise direction from the top of user input device 105.2 towards the bottom of user input device 105.2, as shown in FIG. 1B. Continuing this example, performing such a gesture may result in the user interface scrolling in a downward direction through various user interface menu options. When the user moves his finger in the opposite direction along the capacitive touch strip (e.g., in a clockwise direction), display 108 may result in the user interface scrolling in an upward direction through the user interface menu options.

Processing unit 102 may utilize a plurality of capacitive strip user input devices 105.2 as a single user input device 105.2. For instance, a first user input device 105.1 may be a capacitive touch strip positioned on a first side wall and a second user input device 105.2 may be a capacitive touch strip positioned on a second side wall. Processing unit 102 may determine a touch input passing from first user input device 105.1 to second user input device 105.2 as a single continuous gesture.

In embodiments, in response to receive an input to a capacitive touch strip user input device, such as user input device 105.2, processing unit 102 may cause the user interface to move in a path that is similar to a curvature of one or more side walls of watch housing 100. Such functionality may result in a user experience of selecting the user interface and moving it along a side wall of housing 103 to a new location thereby exposing a new portion of the user interface. For instance, a user may input a gesture by moving his finger along the capacitive touch strip 105.2, implemented with several capacitive touch segments on side wall of a circular housing 103, and processing unit 102 may cause the user interface to move in a manner that corresponds to the curved side wall of housing 103. A user may move his finger along the capacitive touch strip user input device 105.2 in a counter-clockwise direction from the bottom of user input device 105.2 towards the top of user input device 105.2 and the user interface may move both laterally and vertically in equal amounts because housing 103 is circular in shape. It is to be understood that this functionality is similarly implemented for a touch input along the capacitive touch strip user input device 105.2 in a clockwise direction. The user interface may move vertically more than laterally if housing 103 is oval in shape (e.g., widest portions of housing 103 correspond to the locations for 12:00 and 6:00 when watch 100 is worn).

Processing unit 102 may cause user interface to scroll one or more directions in response to determined inputs to a user input device 105.2. To facilitate this functionality, processing unit 102 may execute instructions stored in user interface module 114 to detect an order in which individual segments included in a capacitive touch strip have been touched. Furthermore, the number and/or speed in which individual capacitive touch segments are touched may be interpreted as different types of user input, and therefore be associated with different user interface functions. For example, a user performing a gesture in which her finger is moved along the entirety of the capacitive touch strip may be interpreted as a larger scroll action than the user performing a gesture in which her finger is moved along a portion of the capacitive touch strip. To provide another example, a user may touch and release (or touch and hold) the capacitive touch strip at a single location instead of performing a scrolling gesture. In this instance, processing unit 102 may interpret the user input as one similar to pressing a button, thereby providing a user interface function associated with a button press (e.g., a menu option selection) as discussed above.

In an embodiment, processing unit 102 may execute instructions stored in user interface module 114 to adjust the user interface presented on display 108 based upon changes in the orientation of watch 100. For example, with reference to FIG. 1B, watch 100 may be in an initial orientation, with user input device 105.1 on the right side of watch 100 and user input device 105.2 on the left side. In this orientation, the user interface is preferably presented on display 108 such that the various menu options, settings, etc., may be readable right-side-up. However, if watch 100 is rotated 180 degrees from the illustration shown in FIG. 1B (i.e., with user input device 105.1 on the left side of watch 100 and user input device 105.2 on the right) then the user interface would be upside-down unless the UI compensates for the change in the orientation of watch 100. The user may also changeover (switch) the bands of watch 100 so that a buckle, latch or other mechanism used to fasten the watch to the user's wrist may be in an orientation and location that is familiar to the user.

Therefore, embodiments include processing unit 102 detecting (e.g., via data measured from sensor array 104 or via manual settings or other conditions) the current orientation of watch 100, and causing display 108 to compensate for changes in the orientation of watch 100. However, such orientations of watch 100 may cause the physical position of user input devices 105.1 and 105.2 to change with respect to the user interface, and therefore the user interface functions associated with these user input devices also needs to be adjusted to maintain a consistent user interface experience. For example, a counter-clockwise scrolling gesture of user input device 105.2 should be interpreted as a downward scrolling gesture when watch 100 is in the orientation shown in FIG. 1B—an intuitive user interface function in this orientation. But upon rotating watch 100 by 180 degrees, the same downward scrolling gesture is now performed in the clockwise direction. Thus, to maintain an intuitive user interface functionality and consistent UI experience, embodiments include adjusting received user inputs according to the orientation of watch 100.

Furthermore, embodiments include watch 100 maintaining intuitive user interface functionality for user inputs in addition to, or as an alternative to, the scrolling gestures discussed above. For example, if a user touches the capacitive touch strip at a single location instead of performing a scrolling gesture, a particular user interface function may be associated with that location. To provide an illustrative example, a user may touch the top of user input device 105.2, at the "10:30" position on watch 100 when in the orientation shown in FIG. 1B. However, upon watch 100 being rotated 180 degrees, this would adjust into user input device 105.2 being touched at the "4:30" location. To resolve these issues, embodiments include changing how user input is processed for any user input devices 105.1-105.N that may change position upon watch 100 being rotated. In the previous example, this would result in inverting the user inputs received via button-type touches of user input device 105.2. That is, a button-type user input received at the top portion of user input device 105.2 (the 10:30 position) may provide upward scrolling functionality when watch 100 is in the same orientation as shown in FIG. 1B, but may be inverted via processing until 102 to provide downward scrolling when rotated by 180 degrees (and then being in the 4:30 position).

To accomplish this, user input adjustment module 116 includes instructions, that when executed by processing unit 102, cause processing unit 102 to interpret user inputs received via one or more user input devices 105.1-105.N differently based upon whether various conditions are met, which are further discussed below. That is, once a particular user input is adjusted, processing unit 102 may execute instructions stored in user interface module 114 such that the adjusted user input is used to provide the corresponding user interface functionality. Depending on whether or not certain conditions are met, the received user input may be interpreted as the original user input, or the user input may be inverted or otherwise modified to maintain consistency for the user while interacting with watch 100.

The conditions that cause processing unit 102 to interpret user inputs in various ways may be any suitable conditions to compensate for changes in the orientation of the watch, to maintain user interface consistency, and/or may be based upon user preferences. For example, the orientation of the watch may be associated with the interpretation of a particular type of user input. This may be accomplished, for example, by assigning a default orientation, which may be determined via sensor array 104 and/or established as part of an initial setup procedure of watch 100. For example, upon setting up watch 100 for the first time, a user may be asked which way watch 100 is to be worn, thereby establishing a default watch orientation and a default user input adjustment associated with that default orientation. As an example, the default orientation may be the same as the orientation of watch 100, as shown in FIG. 1B. In this orientation, user input received via user input device 105.2, for example, would not need to be inverted, while rotating watch 100 degrees would trigger the inversion of user input received from user input device 105.2.

To provide another example, a user may decide to change how watch 100 will be worn and manually specify this new orientation, which is further discussed below with reference to FIG. 3. In other words, a user may prefer to wear watch 100 in a different orientation on the same wrist, or may decide to wear watch 100 on the opposite wrist, causing watch 100 to be rotated by 180 degrees.

In various embodiments, a user may specify certain user input devices such that user input is interpreted for these specified user input devices based upon whether certain conditions are met (e.g., the orientation of the watch), or a default set of user input devices may automatically be treated in this manner. That is, embodiments include processing unit 102 interpreting the user input received from some (or all) of user input devices 105.1-105.N based upon whether various conditions are met, while the user input received from some (or all) of user inputs 105.1-105.N may be interpreted in the same manner regardless of whether such conditions are met. For example, a user may wish to maintain the user interface functionality associated with user input device 105.1 regardless of the orientation of watch 100, while the user input received via user input device 105.2 may be interpreted in a manner dependent upon the orientation of watch 100.

To provide another example, a user may specify time and/or time periods as a condition of interpretation of user input received via one or more of user input devices 105.1-105.N. For example, a user may determine that certain exercises (e.g., push-ups) cause her wrist to activate user input device 105.1, and as a result she switches the orientation of watch 100 on her wrist before performing such exercises. If the user goes to the gym to perform these exercises at a similar time each day, the user may specify a start and stop time associated with this time period. During the specified time period, processing unit 102 would then interpret user input received via user input device 105.2 to compensate for changes in the orientation of watch 100, as discussed above. Once the specified time period has ended, processing unit 102 would then resume the previous interpretation of user input received via user input device 105.2 without inverting this input. Because the orientation of the watch is not needed in this instance, such embodiments may be particularly useful, for example, when watch 100 does not implement a sensor array, thereby saving costs.

FIGS. 2A-2D are illustrations of various watches having different combinations of user-input devices, in accordance with various embodiments of the present disclosure. As discussed above with reference to FIGS. 1A-1B, watch 100 may be implemented with any suitable number and type of user input devices. Each of FIGS. 2A-2D illustrates a watch having a different combination of user input devices, although the embodiments described herein are not limited to these examples. Each watch shown in FIGS. 2A-2D includes a watch housing 200, and one or more user inputs may be positioned at various locations along watch housing 200 depending on the particular watch implementation.

For example, as shown in FIG. 2A, the watch is implemented in a similar manner as watch 100, as shown in FIG. 1B. The watch shown in FIG. 2A includes a watch housing 200 and a button 206, which is coupled to the watch at the side wall of watch housing 200 and may correspond to user input device 105.1, for example, as shown in FIG. 1B. Furthermore, the watch shown in FIG. 2A includes a capacitive touch strip 204 coupled to the watch at the side wall of watch housing 200, which may correspond to user input device 105.2, for example, as shown in FIG. 1B.

Figure 2B:
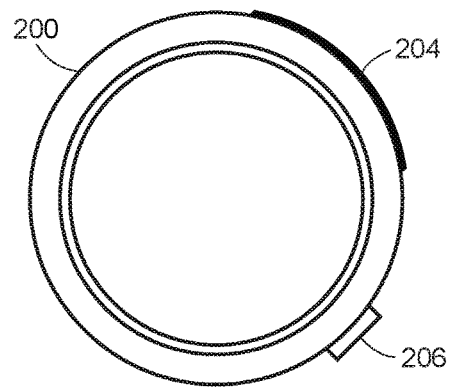

The watch shown in FIG. 2B, however, includes a capacitive touch strip 204 and a button 206 on the same side of the watch, with each being located at the side wall of watch housing 200. Although not shown in FIG. 2B, embodiments may also include the watch having capacitive touch strips and buttons on both sides of the watch housing 200 and coupled to the watch at any suitable location.

Figure 2C:
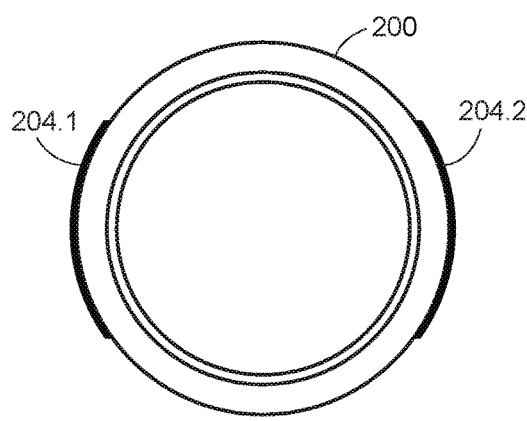

The watch shown in FIG. 2C includes two capacitive touch strips 204.1 and 204.2, with one capacitive touch strip being on each side wall of watch housing 200. Again, the watch may be implemented with any suitable number of capacitive touch strips, which may be the same size or be different sizes. For example, one large capacitive touch strip may be positioned on one side of the watch while two smaller capacitive touch strips may be positioned on the opposite side of the watch.

Using the watch shown in FIG. 2C as an illustrative example, capacitive touch strips 204.1 and 204.2 may each include any suitable number of capacitive touch segments, but for ease of explanation each is assumed to have three equally sized and spaced capacitive touch segments. In the orientation shown in FIG. 2C, capacitive touch strip 204.1 would then include a capacitive touch segment in the upper left of watch housing 200 (UL), a capacitive touch segment at the midpoint or center left of watch housing 200 (CL), and a capacitive touch segment in the lower left of watch housing 200 (LL). Furthermore, capacitive touch strip 204.2 would then include a capacitive touch segment in the upper right of watch housing 200 (UR), a capacitive touch segment at the midpoint or center right of watch housing 200 (CR), and a capacitive touch segment in the lower right of watch housing 200 (LR). Therefore, when the watch shown in FIG. 2C is rotated 180 degrees, capacitive touch segments UL and LR switch positions, capacitive touch segments LL and UR switch positions, and capacitive touch segments CL and CR switch positions.

Each of capacitive touch segments UL, CL, LL, UR, CR, and LR may have user interface functions associated therewith to facilitate interaction via the user interface presented via the watch display. For example, each of capacitive touch segments UL, CL, LL, UR, CR, and LR may facilitate scrolling in a particular direction (e.g., when the capacitive segments are pressed in the order UL-CL-LL, a user input may be interpreted as a downward scrolling gesture). To provide another example, each capacitive touch segment may be associated with selecting a menu option or other selection displayed on the watch at each of these respective locations.

Continuing this example, embodiments include processing unit 120 interpreting the orientation of the watch as being in one of two orientations, the first being shown in FIG. 2C, and the second being the result of rotating the watch as shown in FIG. 2C by 180 degrees. When the orientation of the watch is changed by 180 degrees from the orientation shown in FIG. 2C, processing unit 102 may switch the user interface functions associated with the capacitive touch segments. More specifically, processing unit may switch the user interface functions of UL and LR, LL and UR, and CL and CR as each of these capacitive touch segments switch positions. In this way, the user input devices 204.1 and 204.2 provide different user interface functions based upon the orientation of the watch. As a result, the user interface functions associated with each user input device is maintained with respect to the user interface presented via the watch display regardless of the orientation of the watch (assuming the user interface also rotates to be right-side-up as the watch is rotated 180 degrees).

Figure 2D:
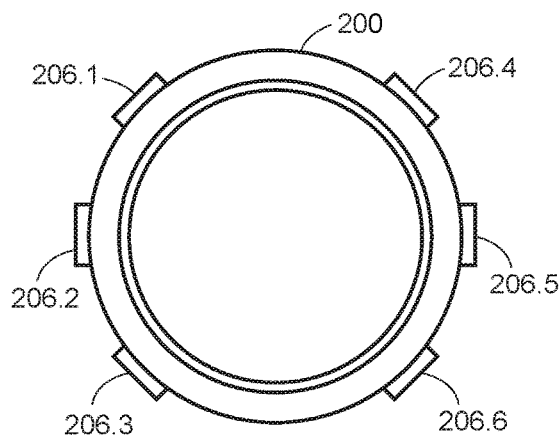

The watch shown in FIG. 2D includes six buttons 204.1-204.6, with buttons 204.1-204.3 being on the left side wall of watch housing 200, and buttons 204.4-204.6 being on the right side wall of watch housing 200 in the orientation shown in FIG. 2D. Again, the watch may be implemented with any suitable number of buttons and/or capacitive touch strips. For example, the watch may include four buttons instead of the six shown in FIG. 2D, with the center buttons 206.2 and 206.5 being omitted.

Using the watch shown in FIG. 2D as an illustrative example, when the watch is rotated 180 degrees, buttons 206.1 and 206.6 switch positions, buttons 206.2 and 206.5 switch positions, and buttons 206.3 and 206.4 switch positions. Each of buttons 204.1-204.6 may have user interface functions associated therewith to facilitate interaction via the user interface presented via the watch display. For example, each of buttons 204.1-204.6 may facilitate scrolling in a particular direction or selecting a menu option or other selection displayed on the watch at each of these respective locations.

Continuing this example, embodiments include processing unit 102 interpreting the orientation of the watch as being in one of two orientations, the first being shown in FIG. 2D, and the second being the result of rotating the watch as shown in FIG. 2D by 180 degrees. When the orientation of the watch is changed by 180 degrees from the orientation shown in FIG. 2D, processing unit 102 may switch the user interface functions associated with the buttons commensurate with their new positions. More specifically, processing unit 102 may switch the user interface functions associated with buttons 206.1 and 206.6, buttons 206.2 and 206.5, and buttons 206.3 and 206.4, as each of these buttons switch positions.

Figure 3:
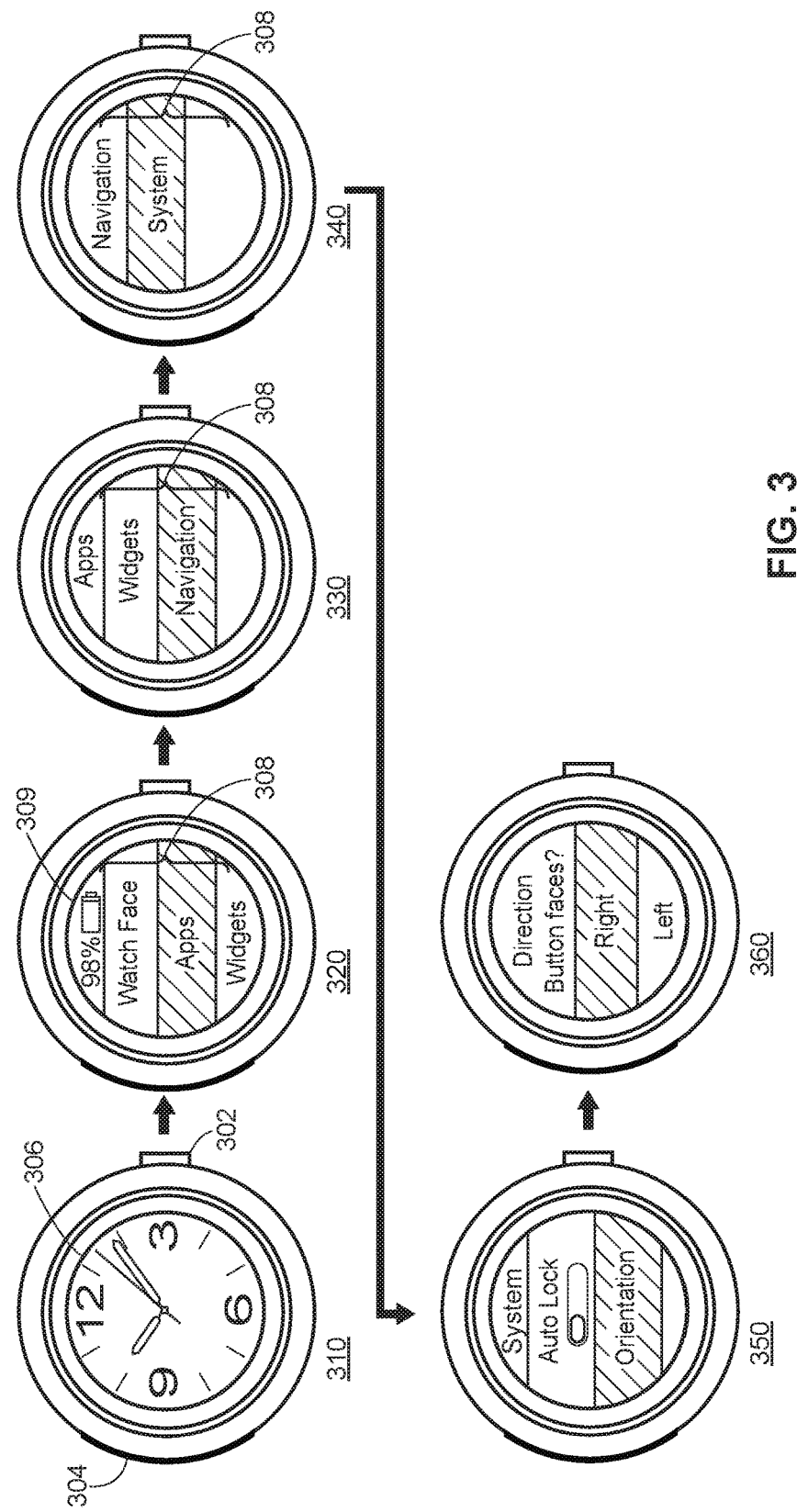
FIG. 3 is an illustration showing the various steps associated with a user interacting with the watch UI to manually select the watch orientation, in accordance with an embodiment of the present disclosure.

FIG. 3 is an illustration showing the various steps associated with a user interacting with the watch UI to manually select the watch orientation, in accordance with an embodiment of the present disclosure. The watch shown in FIG. 3 includes two user input devices: a button 302 and a capacitive touch strip 304. The watch also includes a display 306, which may be a touch-sensitive display, for example. A progression of watch screens is shown in FIG. 3 starting at screenshot 310, which shows the watch displaying time prior to a user accessing the user interface.

Screenshot 320 shows a transition from the clock shown in screenshot 310. In various embodiments, this transition may be in response to receipt of a specific user input associated with viewing menu options. For example, a user may touch and hold display 306 for a threshold amount of time (e.g., 2 seconds, 3 seconds, etc.) until the user interface transitions to screenshot 310. To provide additional examples, a user may touch and hold button 320, touch and hold capacitive touch strip 304, etc., to transition to screenshot 320.

In any event, screenshot 320 indicates a battery status indicator 309 and menu options 308. In the example shown in FIG. 3, screenshot 320 displays menu options 308 starting with an option to change the watch face, followed by another option to allow a user to view applications installed on the watch, and another option to view widgets installed on the watch. In the implementation of the watch shown in FIG. 3, a user may scroll down through menu options 308 by performing a downward scrolling gesture via capacitive touch strip 304. In other words, as a user moves his finger from the top of capacitive touch strip 304 to the bottom of capacitive touch strip 304 in a counter-clockwise direction, additional menu options will appear to the user. The current selection shown in screenshot 320 is the "apps" selection. However, as a user proceeds to scroll down, a new menu option "navigation," is presented, as shown in screenshot 330. The user may continue scrolling downward through all available menu options or until the desired menu option is found. As shown in screenshot 340, the user has scrolled to the end of the menu options 308, where access to the system menu is found. A user may select the highlighted system menu option, as shown in screenshot 340, via another user input. For example, the user may press button 302, tap capacitive touch strip 304 at the location next to the highlighted menu option, tap display 306, etc.

In other embodiments, the implementation of the watch shown in FIG. 3 may function such that a user may scroll down through menu options 308 by performing an upward gesture via capacitive touch strip 304 analogous to the direction a user's finger would move if a touch input was provided to display 108 implemented as a touch screen display (i.e., content below a current screen is exposed by selecting and holding the UI and dragging the UI in the upward direction). In other words, as a user moves his finger from the bottom of capacitive touch strip 304 to the top of capacitive touch strip 304 in a clockwise direction, additional menu options below the lowest menu option ("Widgets") will appear to the user. The current selection shown in screenshot 320 is the "apps" selection. However, as a user proceeds to scroll up, a new menu option "navigation," is presented, as shown in screenshot 330, by performing an upward gesture. The user may continue moving the UI upward through all available menu options or until the desired menu option is found. As shown in screenshot 340, the user has scrolled to the end of the menu options 308, where access to the system menu is found. A user may select the highlighted system menu option, as shown in screenshot 340, via another user input. For example, the user may press button 302, tap capacitive touch strip 304 at the location next to the highlighted menu option, tap display 306, etc.

Upon selecting the highlighted menu option, the user interface may transition to screenshot 350, which provides system setting options. In the example shown in FIG. 3, these options may include options to turn off the reorientation of the user interface and adjustment of user inputs based upon the orientation of the watch (e.g., by switching "Auto Lock" on or off), as well as selecting the option to specify the orientation of the watch manually (e.g., "Orientation"). Upon selecting the orientation option, the user may then select either a right-facing or a left-facing option. In this way, a user may customize not only how the watch looks (e.g., by changing watch faces) but the functionality of the watch according to his or her preferences.

FIGS. 4A-4F are illustrations of various watch displays showing the compensation of the user interface due to the watch orientation, in accordance with an embodiment of the present disclosure. The watch shown in each of FIGS. 4A-4F includes two user input devices: a button 402 and a capacitive touch strip 404. The watch also includes a display 406, which may be a touch-sensitive display, for example.

Again, processing unit 102 may cause the user interface to be displayed differently based upon the orientation of the watch, such as rotating the user interface along with watch rotations to avoid presenting text and graphics to a user upside-down. Embodiments also include processing unit 120 adjusting the user interface in other ways to compensate for the watch orientation, which may be dependent upon the particular function or menu option that is currently being utilized.

For example, FIGS. 4A-4C correspond to a user interface presented to a user when the watch is in a right-facing orientation, while FIGS. 4D-4F correspond to a user interface presented to a user when the watch is in a left-facing orientation. The screenshots shown in FIGS. 4A and 4D correspond, for example, to a user selecting the "Apps" menu option, as previously shown and discussed with reference to FIG. 3 in screenshots 320 and 330. As shown in FIG. 4A, the user interface allows the user to scroll through the app list using capacitive touch strip 404, and the user's progress through the list of apps is indicated in the displayed scroll bar 407. Because it is preferable for the scroll bar 407 to be adjacent to the capacitive touch strip 404, embodiments include the user interface being adjusted upon the watch rotating 180 degrees to maintain this relationship, as shown in FIG. 4D. Furthermore, the user interface may also compensate for changes in watch orientation by changing the alignment or justification of icons or other graphics, which can be seen by comparing FIGS. 4A and 4D.

Of course, as previously discussed, user inputs received via capacitive touch strip 404 may also be adjusted by processing unit 102 to provide equivalent user interface functionality in either orientation (e.g., scrolling downward) despite the user's gesture along capacitive touch strip 404 being counter-clockwise in the orientation shown in FIG. 4A versus clockwise in the orientation shown in FIG. 4D.

Furthermore, the screenshots shown in FIGS. 4B and 4E may correspond, for example, to a user selecting one of the listed apps, such as "run" for example, which causes the watch to execute a running application, i.e., to track the user's distance, time, heart rate, etc. As shown in FIG. 4B, the user interface allows the user to scroll to view additional information while using the running application using capacitive touch strip 404, which are not shown in FIG. 4 for purposes of brevity but may include, for example, a map of the route, the average time from previous runs, previous individual run times, best and worst run times, etc.

The particular screen the user is viewing among the total screens available is reflected in the displayed scroll bar 410. In FIGS. 4B and 4E, scroll bar 410 indicates that the user is on the first screen of four total screens. Again, because it is preferable for scroll bar 410 to be adjacent to capacitive touch strip 404, embodiments include the user interface being adjusted upon the watch rotating 180 degrees to maintain this relationship, as shown in FIG. 4E. Once again, user inputs received via capacitive touch strip 404 may also be adjusted by processing unit 102 to provide equivalent user interface functionality in either orientation (e.g., scrolling downward) despite the user's gesture along capacitive touch strip 404 being counter-clockwise in the orientation shown in FIG. 4B versus clockwise in the orientation shown in FIG. 4E.

The screenshots shown in FIGS. 4C and 4F may correspond, for example, to a user entering the menu options screen, as previously shown and discussed with reference to FIG. 3 in screenshots 320, 330, and 340. Although the user input received via capacitive touch strip 404 may be changed based upon the orientation of the watch, as discussed above, the menu options shown in FIGS. 4C and 4F do not include scroll bars or otherwise need to be aligned or modified due to such changes. Therefore, FIGS. 4C and 4F illustrate menu options that are displayed in the same manner to a user regardless of the orientation of the watch.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application.

What is claimed is:

1. A watch having a watch housing, the watch comprising:
a watch face display configured to present a user interface;
a sensor configured to determine a current orientation of the watch, the current orientation being one of a first orientation or a second orientation;
a user input device on a side wall of the watch housing, the user input device formed of a capacitive touch strip including a plurality of capacitive touch segments and providing a user interface function upon receipt of a gesture made in one of a first direction or a second direction with respect to the user input device, the first direction being opposite to the second direction and the user interface function is a scrolling function in a direction indicated by the gesture; and
a processing unit coupled with the watch face display, the sensor, and the user input device, the processing unit configured to:
adjust the user interface presented on the watch face display based on the determined orientation of the watch,
configure the user input device to have a first user interface function when the watch is determined to be in the first orientation,
configure the user input device to have a second user interface function when the watch is determined to be in the second orientation by switching the user interface functions associated with a first one of the plurality of capacitive touch segments and a second one of the plurality of capacitive touch segments upon detecting that the orientation of the watch has changed from the first orientation to the second orientation, and
determine whether the gesture is in the first direction or the second direction by determining an order in which one or more of the plurality of capacitive touch segments have been touched;
wherein the capacitive touch strip is configured to provide the first user interface function upon receipt of an input indicating that the first one of the plurality of capacitive touch segments has been touched,
wherein the capacitive touch strip is configured to provide the second user interface function upon receipt of an input indicating that the second one of the plurality of capacitive touch segments has been touched;
wherein the first capacitive touch segment is located in the upper half and the second capacitive touch segment is located in the lower half of the watch in the first orientation; and
wherein the first capacitive touch segment is located in the lower half and the second capacitive touch segment is located in the upper half of the watch in the second orientation.

2. The watch of claim 1, wherein the user interface presents menu options, and wherein the first and second user interface functions facilitate scrolling through the menu options.

3. The watch of claim 1, wherein the user input device is positioned on the left side wall of the watch housing in the first orientation and on the right side wall of the watch housing in the second orientation.

4. The watch of claim 1, wherein the processing unit is further configured to cause the watch face display to adjust the user interface to compensate for changes in the orientation of the watch.

5. The watch of claim 1, wherein the first orientation and the second orientation differ from one another by 180 degrees.

6. A watch having a watch housing, the watch comprising:
a watch face display configured to present a user interface;
a sensor configured to determine a current orientation of the watch, the current orientation being one of a first orientation or a second orientation;
a first user input device on a side wall of the watch housing formed of a first capacitive touch strip including a plurality of capacitive touch segments and being associated with a first user interface function, the first user interface function being one of an upward scrolling function or a downward scrolling function;
a second user input device on a side wall of the watch formed of a second capacitive touch strip including a plurality of capacitive touch segments and being associated with a second user interface function, the second user interface function is one of an upward scrolling function or a downward scrolling function; and
a processing unit coupled with the watch face display, the sensor, and the user input device, the processing unit configured to:
adjust the user interface presented on the display based on the determined orientation of the watch, and
switch the user interface functions associated with the first user input device and the second user input device upon detecting that the orientation of the watch has changed from the first orientation to the second orientation, determine whether the first user interface function is the upward scrolling function or the downward scrolling function by determining an order in which one or more of the plurality of capacitive touch segments associated with the first capacitive touch strip have been touched, and determine whether the second user interface function is the upward scrolling function or the downward scrolling function by determining an order in which one or more of the plurality of capacitive touch segments associated with the second capacitive touch strip have been touched.

7. The watch of claim 6, wherein the first user input device is located at a first position in the upper half of the watch when the watch is in the first orientation, and in the lower half of the watch when the watch is in the second orientation, and wherein the second user input device is located at a second position in the lower half of the watch when the watch is in the first orientation, and in the upper half of the watch when the watch is in the second orientation.

8. The watch of claim 6, wherein the user interface presents menu options, and wherein the upward scrolling function and the downward scrolling functions facilitate a user scrolling through the menu options.

9. The watch of claim 6, wherein the first user input device and the second user input device are each located at a midpoint of a first side wall and a second side wall of the watch housing, respectively, wherein the first user input device is positioned on the right side of the watch in the first orientation and on the left side of the watch in the second orientation, and wherein the second user input device is positioned on the left side of the watch in the first orientation and on the right side of the watch in the second orientation.

10. A watch having a watch housing, the watch comprising:

a sensor configured to determine a current orientation of the watch;

a watch face display configured to present a user interface;

a first user input device on a side wall of the watch formed of a first capacitive touch strip including a plurality of capacitive touch segments;

a second user input device on the side wall of the watch formed of a second capacitive touch strip including a plurality of capacitive touch segments; and a processing unit coupled with the sensor, the watch face display, the first user input device and the second input device, the processing unit configured to:

adjust the user interface presented on the display based on the determined orientation of the watch, configure the first user input device to have a first user interface function when the watch is determined to be in a first orientation, configure the first user input device to have a second user interface function when the watch is determined to be in a second orientation, configure the second user input device to have the second user interface function when the watch is determined to be in the first orientation, configure the second user input device to have the first user interface function when the watch is determined to be in the second orientation, determine whether the first user interface function is an upward scrolling function or a downward scrolling function by determining an order in which one or more of the plurality of capacitive touch segments associated with the first capacitive touch strip have been touched, and determine whether the second user interface function is the upward scrolling function or the downward scrolling function by determining an order in which one or more of the plurality of capacitive touch segments associated with the second capacitive touch strip have been touched;

wherein the user interface functions associated the first user input device and the second user input device are switched to maintain the same user interface functionality with respect to the orientation of the user interface regardless of the orientation of the watch.

11. The watch of claim 10, wherein the first user input device is located at a position in the upper half of the watch when the watch is in the first orientation, and in the lower half of the watch when the watch is in the second orientation, and wherein the second user input device is located at a second position in the lower half of the watch when the watch is in the first orientation, and in the upper half of the watch when the watch is in the second orientation.

12. The watch of claim 10, wherein the first user interface function is an upward scrolling function and the second user interface function is a downward scrolling functions.

13. The watch of claim 12, wherein the user interface presents menu options, and wherein the upward scrolling function and the downward scrolling function each facilitates a user scrolling through the presented menu options.

14. The watch of claim 10, wherein the first orientation and the second orientation differ from one another by 180 degrees.

* * * * *